Oct. 2, 1962 K. BAÜR 3,056,959
MULTIPLE-WAVE DIRECTION FINDER
Filed April 13, 1959 2 Sheets-Sheet 1

Inventor:
Karl Baür
By [signature]
Patent Agent

Inventor:
Karl Baür
By [signature]
Patent Agent

3,056,959
MULTIPLE-WAVE DIRECTION FINDER
Karl Baür, Ulm (Danube), Germany, assignor, by mesne assignments, to Telefunken Patentverwertungs-G.m.b.H., Ulm (Danube), Germany
Filed Apr. 13, 1959, Ser. No. 805,805
Claims priority, application Germany Apr. 12, 1958
6 Claims. (Cl. 343—113)

The present invention relates to a system for direction finding employing $n$ waves within one channel. With the novel system, directions may be found particularly with coherent waves, i.e., waves of the same frequency.

In many instances, an interference field is present at the direction finder station. Such field may be caused by the reception of waves of the same transmitter via different paths by a directional receiver, or by the reflection of waves by various obstacles and the superposition of these waves on the directly-arriving wave at the receiving station. The interference field may also be caused by superposition of waves of the same frequency from different transmitters.

In all instances, the conventional direction finders give unsatisfactory results. Although direction finding is possible according to the two-frequency principle of Watson Watt, for example, for transmitters within the same channel, but at different frequencies, such direction finding system fails in case of the reception of waves of the same frequency.

Several proposals have been employed to make direction finding possible also in this case. The proposed systems are very elaborate and have not resulted so far in a satisfactory solution. Thus, recently, a wide base direction finder, known as "Wullenwever," was developed. This apparatus comprises a large directionally oscillating linear antenna, by means of which acute pattern lobes are produced. With this system, transmitters of the same frequency may be located at different angles, particularly, if these angles are lying so far from each other that they do not fall in the beam angle of the pattern. However, this system was very complex and expensive.

Another known arrangement for direction finding in the presence of an interference wave is an apparatus known as "Doppler direction finder." Although this system reduces the direction finding error as compared with the Adcock system, it does not eliminate it. In addition, it has the great disadvantage of being very expensive.

As can be seen from the known systems, no satisfactory solution has been found to the problem of simultaneously measuring the directions of several waves of the same frequency.

Therefore, it is an object of the present invention to provide an apparatus, by means of which the angles of arrival of several waves within the same frequency range can be measured simultaneously, particularly waves of the same frequency.

It is another object of this invention to provide a system for direction finding using $n$ waves within one frequency range by means of $2n$ antennas, exclusive of the case where $n=1$, in which case, three antennas are necessary. Each of the antennas is to be connected to a frequency-selective transmission line. In order to evaluate the high frequency voltages derived from the output of the transmission lines, a computing device is provided which interprets the $2n$ voltages $$V_{\mu(\mu=1\ldots 2n)}=\sum_{\nu=1}^{n}A_\mu e^{-j(x_\mu u_\nu+y_\mu v_\nu)}$$

in accordance with the $n$ equations obtained by the elimination of the factor $A\nu$, so that voltages are available indicating the respective sine and cosine functions of the $n$ azimuth angles. In the above equation: $A_v = Ee^{j\vartheta}$ is a factor which, dependent upon the magnitude and phase, $x_\mu$, $y_\mu$, designate the location of the antenna by rectangular coordinates $u_v = k \cos \epsilon_v \cos \alpha_v$ and $$v_v = k \cos \epsilon_v \sin \alpha_v$$

wherein $\epsilon_v$ is the elevation, $k$ the wave number and $\alpha_v$ the azimuth incidence angle.

The present invention differs from the known methods of direction finding and provides a novel system therefor. The theoretical basis which led to the invention will be described in the following. In addition, it will be shown how the new system has to be designed. Generally, only the indication of the azimuth angle of the waves is of interest. We are only concerned with this analysis. Obviously, it is possible to ascertain other coordinates of the waves by providing modified circuits.

For the voltage of an antenna at the point $r$, of the plane, there is obtained in case of $n$ waves:

$$V=\sum_{\nu=1}^{n}A e^{-jkr\cos\epsilon_\nu\cos(\alpha_\nu-\vartheta)} \quad (1)$$

wherein:

$V$=antenna voltage
$n$=total number of the waves present
$\nu$=designation of a single but arbitrary one of the waves present
$A_v = Ee^{j\vartheta}$ is a factor depending upon the phase and magnitude
$k=\frac{2\pi}{\lambda}$ number of waves
$\epsilon_v$=elevation
$\alpha_v$=azimuth angle Assuming that $$r \cos \vartheta = x$$
$$r \sin \vartheta = y$$

and that $$k \cos \epsilon_\nu \cos \alpha_\nu = u_\nu$$
$$k \cos \epsilon_\nu \sin \alpha_\nu = v_\nu$$

then the voltage V of an antenna is defined by rectangular coordinates as follows:

$$V=\sum_{\nu=1}^{n}A_\nu e^{-j(xu_\nu+yv_\nu)} \quad (2)$$

It follows that, in the presence of $n$-waves, at the input channel for the determination of the characteristics of the $n$ waves, at least $2n$ antennas are necessary. However, this law does not apply in case of $n=1$, where three antennas are necessary for ascertaining the coordinates of a wave.

Further consideration is now given to the case of two waves of equal frequencies. For ascertaining the ocordinates of two waves, $2n$ signals, i.e., four antennas or their signals, are required. The four signals are as follows:

$$V_1=A_1e^{-j(x_1u_1+y_1v_1)}+A_2e^{-j(x_1u_2+y_1v_2)}$$
$$V_2=A_1e^{-j(x_2u_1+y_2v_1)}+A_2e^{-j(x_2u_2+y_2v_2)}$$
$$V_3=A_1e^{-j(x_3u_1+y_3v_1)}+A_2e^{-j(x_3u_2+y_3v_2)}$$
$$V_4=A_1e^{-j(x_4u_1+y_4v_1)}+A_2e^{-j(x_4u_2+y_4v_2)} \quad (3)$$

Still further objects and the entire scope of applicability of the present invention will become apparent from the detailed description given hereinafter; it should be understood, however, that detailed description and specific examples, while indicating preferred embodiments of the invention, are given by way of illustration only, since various changes and modifications within the spirit and scope of the invention will become apparent to those skilled in the the art from this detailed description.

In the drawings:

FIGURE 1 schematically illustrates the placement of four antennas used in finding the directions of two waves;

FIGURE 2 schematically shows the placement of three antennas used in finding the direction of a single wave;

Figure 5:
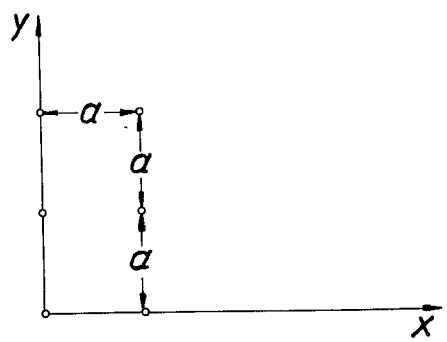
Figure 6:
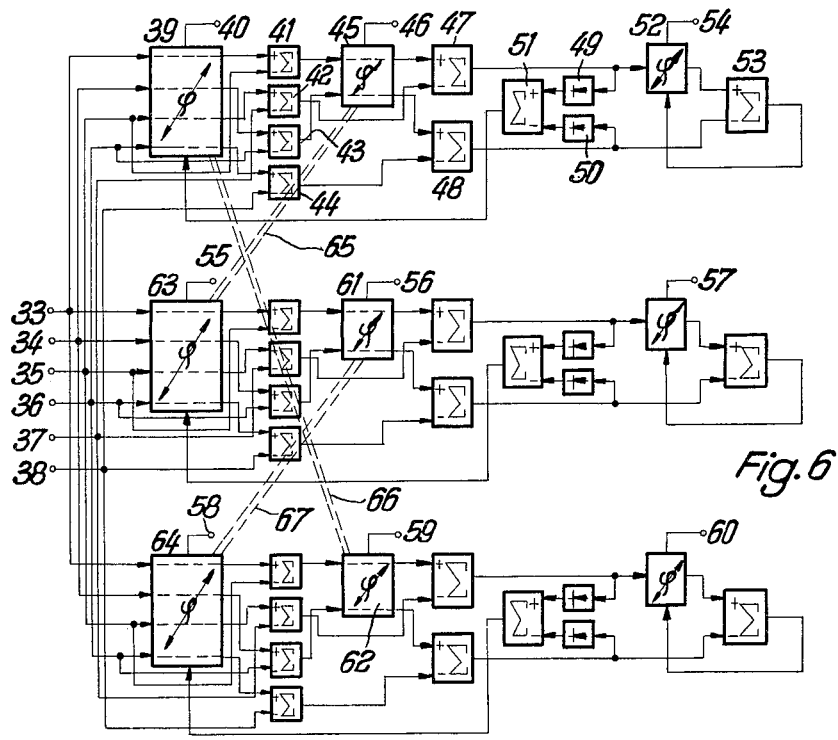

FIGURE 5 schematically shows the placement of six antennas used in finding the directions of three waves;

FIGURE 6 is a block diagram of a computer to be fed by the antennas of FIGURE 5 to determine the coordinates of the sources of said three waves.

Figure 1:
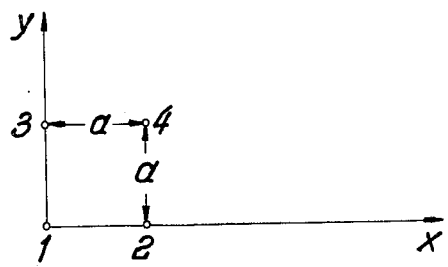

If the antennas 1, 2, 3 and 4 are provided, as shown in FIGURE 1, the coordinates of the positions of the individual antennas are as follows:

$$x_1=0 \quad y_1=0$$
$$x_2=a \quad y_2=0$$
$$x_3=0 \quad y_3=a$$
$$x_4=a \quad y_4=a$$

Thus, the equations for the antenna voltages are:

$$V_1 = A_1 + A_2$$
$$V_2 = A_1 e^{-jau_1} + A_2 e^{-jau_2}$$
$$V_3 = A_1 e^{-jav_1} + A_2 e^{-jav_2}$$
$$V_4 = A_1 e^{-ja(u_1+v_1)} + A_2 e^{-ja(u_2+v_2)} \quad (4)$$

If $A_1$ and $A_2$ are eliminated from the four equations, the following two equations will result:

$$\frac{V_1 e^{-jau_1} - V_2}{V_3 e^{-jau_1} - V_4} e^{-jav_2} = 1 \quad (5)$$

$$\frac{V_1 e^{-jav_1} - V_3}{V_2 e^{-jav_1} - V_4} e^{-jau_2} = 1 \quad (6)$$

These two equations have to be solved by a computing circuit. Voltages proportional to the magnitudes $au_1$ and $av_1$, or $au_2$ and $av_2$ are derived from the output terminals of this computing circuit, in order to measure the bearing angle. If these magnitudes $au_1$ and $av_1$ or $au_2$ and $av_2$ are applied to the deflection system of a cathode ray tube, the two angles $\alpha_1$ and $\alpha_2$ are directly indicated, $$\left( \tan \alpha_\nu = \frac{v_\nu}{u_\nu} \right)$$

Figure 2:
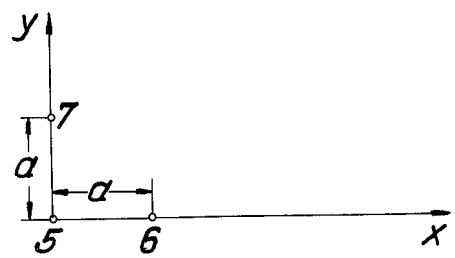

Prior to considering the circuit design of a two-wave direction finder, a one-wave direction finder in accordance with the inventive principle will be discussed so as to facilitate an understanding of the invention. As mentioned in the foregoing, at least three antennas 5, 6 and 7 are necessary in this case. These antennas should be arranged as shown in FIGURE 2. The following three equations are obtained for the three antenna voltages:

$$V_1 = A$$
$$V_2 = A e^{-jau}$$
$$V_3 = A e^{-jav} \quad (7)$$

After elimination of A, the following equations will result:

$$V_1 e^{-jau} - V_2 = 0 \quad (8)$$
$$V_1 e^{-jav} - V_3 = 0 \quad (9)$$

Figure 3:
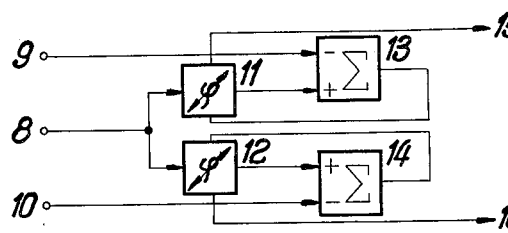
FIGURE 3 is a block diagram of a computer to be fed by the antennas of FIGURE 2 to determine the coordinates of the source of said signal wave.

A computing circuit furnishing voltages across its output terminals proportional to the magnitudes $au$ and $av$ is shown in FIGURE 3. An analog computer is provided as the evaluation circuit. A frequency-selective amplifier may be connected between each antenna and the computing device.

The amplified voltage $V_1$ of the receiving antenna 5 is fed to phase shifters 11 and 12 via a terminal 8. The output voltage of the phase shifter 11 and the amplified antenna voltage $V_2$ of the receiving antenna 6 fed via a terminal 9 are supplied to a summation circuit 13 with such a polarity that they are subtracted and the difference is obtained according to Equation 8. Likewise, the difference of the output voltage of the phase shifter 12 and of the amplified voltage $V_3$ of the receiving antenna 7 fed via a terminal 10 is obtained according to Equation 9. The output voltage of the two summation circuits will be zero according to the Equations 8, 9, if the phase of the antenna voltage $V_1$ is rotated by value $au$. It is now possible to indicate the output voltage Δ of the summation circuits and to manually control the phase shifters until the output voltage Δ becomes zero. The voltage may also be used directly for phase shifting. For this purpose, the output voltage of the summation circuits is supplied to a control member of the phase shifters 11 and 12, as shown in FIGURE 3. The phase shifters 11 and 12 are designed in such a manner, that voltages can be derived across output terminals 15 and 16 of these phase shifters, said voltages being proportional to the phase shifts $au$, $av$. If these voltages are applied to the deflection system of a cathode ray tube, the azimuth direction is directly indicated.

The corresponding equations for a two-wave direction finder have been given in the foregoing, see Equations 5 and 6.

Figure 4:
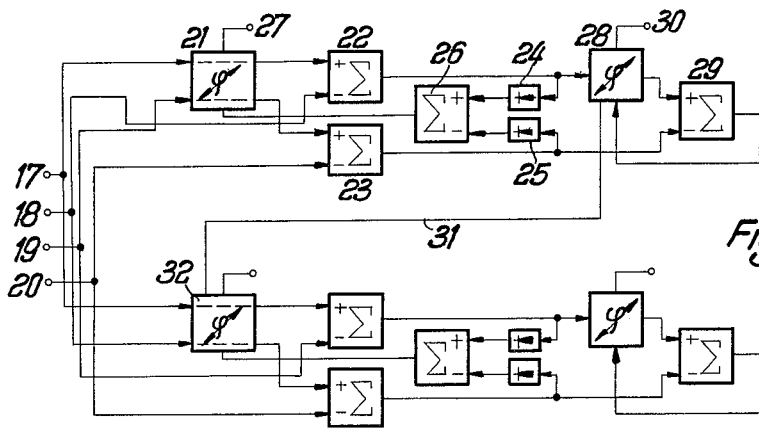
FIGURE 4 is a block diagram of a computer to be fed by the antennas of FIGURE 1 to determine the coordinates of the sources of said two waves.

The corresponding circuit, i.e., also an analog computer for the evaluation of the antenna voltages $V_1$, $V_2$, $V_3$ and $V_4$, is illustrated in FIGURE 4. Frequency-selective amplifiers can be inserted between the antennas and terminals 17, 18, 19 and 20. The Equation 5 shows that the voltages $V_1$ and $V_3$ have to be varied in their phase by the value $au_1$ in order to obtain equal values of the differences of the numerator and denominator of the Equation 5. For this purpose, the voltages $V_1$ and $V_3$ are fed to a phase shifter 21 via the terminals 17 and 19. The difference in accordance with the numerator of Equation 5 is formed in a summation circuit 22, while the difference in accordance with the denominator of Equation 5 is formed in a summation circuit 23. The output voltages of the two summation circuits are rectified in diodes 24 and 25. The difference of the two D.C. voltages is obtained in a summation circuit 26 in accordance with the polarity. The output voltage of this summation circuit 26 is fed to the phase shifter 21 and rotates the phase until the differences formed in the two summation circuits 22 and 23 have the same values. The output voltage of the summation circuit 26 then becomes zero. Obviously, also in this case, manual control of the phase may be carried out.

The phase shifter 21 may be designed so that, at output terminal 27, a voltage will appear which is proportional to the value $au_1$, e.g., the phase rotation. In addition, the output voltage of the summation circuit 22

$$(V_1 e^{-jau_1} - V_2)$$

will be fed to a further phase shifter 28. The output voltage of this phase shifter 28, together with the output voltage of the summation circuit 23 ($V_3 e^{-jau_1} - V_4$) are fed to a summation circuit 29. After adjusting the phase shifter 21, the numerator and the denominator of the Equation 5 have the same value. However, in order to satisfy the Equation 5, the voltage $V_1 e^{-jau_1} - V_2$ has to be rotated by the phase $av_2$. This phase rotation is accomplished by means of the phase shifter 28 which is controlled by the output voltage of a summation circuit 29. If the phase shifter 28 has obtained a position in which $(V_1 e^{-jau_1} - V_2) e^{-jav_2} - (V_3 e^{jau_1} - V_4)$ becomes zero, the output voltage of the summation circuit 29 is also zero. Then, the phase shifter 28 remains in this position. At output terminal 30 of the phase shifter 28, a voltage will appear which is proportional to the value $av_2$.

The Equation 6, shown in the circuit illustrated in the lower part of FIGURE 4, is similarly explained. In this circuit, output voltages are obtained which are proportional to the valeus $av_1$ and $au_2$. If the proportional voltages $au_1$ and $av_1$ or $au_2$ and $av_2$ are fed to the deflection systems of a multi-beam indicator tube or of two cathode ray tubes, the azimuth angles of the two incoming waves are indicated.

It is possible that the system, in the two branches, assumes the same values. Therefore, the two phase shifters 28 and 32 are interconnected by a coupling line 31 which, together with apporpriate means of the type well known in the art, serves to prevent the two phase shifters from adjusting to the same values.

The above applies in case of a reception of two waves. The system will fail in the case, where more than two waves are received. However, in case of a single wave, the azimuth of the later will be indicated. In this latter instance, only two phase shifters respond and give the desired voltages. Only one angle is automatically indicated by means of this system.

An antenna system for determining the angles of three waves is shown in FIGURE 5. For the three-wave indicator, the following equations are obtained:

$$\frac{(V_1 e^{-jav_1} - V_3) e^{-jav_2} - (V_3 e^{-jav_1} - V_5)}{(V_2 e^{-jav_1} - V_4) e^{-jav_2} - (V_4 e^{-jav_1} - V_6)} e^{-jau_3} = 1 \quad (10)$$

$$\frac{(V_1 e^{-jav_2} - V_3) e^{-jav_3} - (V_3 e^{-jav_2} - V_5)}{(V_2 e^{-jav_2} - V_4) e^{-jav_3} - (V_4 e^{-jav_2} - V_6)} e^{-jau_1} = 1 \quad (11)$$

$$\frac{(V_1 e^{-jav_3} - V_3) e^{-jav_1} - (V_3 e^{-jav_3} - V_5)}{(V_2 e^{-jav_3} - V_4) e^{-jav_1} - (V_4 e^{-jav_3} - V_6)} e^{-jau_2} = 1 \quad (12)$$

The corresponding calculating circuit is illustrated in FIGURE 6. This circuit comprises three branches, each of which serves to solve one of the equations. Therefore, it suffices to consider only one branch, i.e., the branch solving the Equation 10, said branch being illustrated in the upper portion of FIGURE 6. As there are $2n=6$ antennas, six antenna voltages have necessarily to be provided. Thus, voltages $V_1$ to $V_6$, inclusive, amplified, for instance, in frequency-selective amplifiers are supplied via terminals 33 to 38. The phases of the voltages $V_1$ to $V_4$ are rotated in a phase shifter 39 by the value $av_1$. Thus, a voltage proportional to the value $av_1$ may be derived at terminal 40. In summation circuits 41 to 44, the differences appearing in the parentheses of the numerators and denominators in the Equation 10 are formed. The phase of the first member of the numerator and the denominator is rotated in a phase shifter 45 by the value $av_2$. A voltage proportional to the value $av_2$ will appear at terminal 46. Summation circuits 47 and 48 form the difference of the numerator and the difference of the denominator of the Equation 10. The outout voltages of the two summation circuits are rectified in members 49 and 50, and the difference between the numerator and denominator is then formed in the summation circuit 51. The difference voltage of the summation circuit 51 influences the phase shifter 39 until the output voltage of the summation circuit 51 becomes zero.

The values of the numerator and of the denominator are then equal. The numerator term in the Equation 10 is rotated in a phase shifter 52 until the difference of this voltage and of the denominator voltage rotated by $au_3$ becomes zero. Then, no output voltage appears at a summation circuit 53. A voltage proportional to the value $au_3$ appears at terminal 54.

The other two computer branches are designated in a similar manner. The following voltages can be obtained from the respective terminals:

At the terminal 55 a voltage proportional to $av_2$
At the terminal 56 a voltage proportional to $av_3$
At the terminal 57 a voltage proportional to $au_1$
At the terminal 58 a voltage proportional to $av_3$
At the terminal 59 a voltage proportional to $av_1$
At the terminal 60 a voltage proportional to $au_2$ All of the values $av_1$, $av_2$ and $av_3$ occur twice. Therefore it is necessary to couple corresponding phase shifters. While the phase shifters 39, 63 and 64 are changed by the action of voltages, each of the phase shifters 45, 61 and 62 is coupled with a phase shifter which changes for about the same value. Coupling shafts 65, 66, and 67 are illustrated in dotted lines. The three azimuth angles to be indicated may be illustrated in a three-beam indicator tube or separately in plural indicator tubes.

The principle disclosed in the three embodiments may be applied to any number of wave trains or to a circuit for evaluating the same. However, with a system designed for a certain number of waves, the azimuth angles for only these or for a smaller number of waves can be determined.

In addition to the finding of the direction of a transmitter in a range of different frequencies, the system according to this invention makes possible the determination of other magnitudes, particularly, of the azimuth angles of coherent waves. A circuit may be designed indicating other values, for instance, elevation. In addition, the antennas could be arranged differently. In place of an analogue circuit, a digital circuit might be used. The computing circuit employed may also serve for separating the waves of different transmitters of the same frequency.

I claim:

1. A system for finding the directions of $n$ waves within one frequency range wherein $n$ is at least 2, comprising an antenna system having $2n$ antennas; computing means; frequency-selective means coupling the antennas to said computing means, the latter receiving the high frequency voltages from the frequency-selective means and analyzing said high frequency voltages $$V_{\mu(\mu=1\ldots 2n)} = \sum_{\nu=1}^{n} A_\nu e^{-j(x_\mu u_\nu + y_\mu v_\nu)}$$

in accordance with $n$ equations obtained by elimination of the factors $A_\nu$, in such manner that voltages corresponding to the sine and cosine components of the $n$ azimuth angles are available for indication, wherein in the above formulas $A_\nu = E e^{j\vartheta}$ is a factor depending upon the magnitude and phase, $x_\mu$, $y_\mu$ is the position of the antenna in rectangular coordinates $u_\nu = k \cos \epsilon_\nu \cos \alpha$ and $v_\nu = k \cos \epsilon_\nu \sin \alpha_\nu$, wherein $\epsilon_\nu$ is the elevation, $k$ the wave number and $\alpha_\nu$ the azimuth angle.

2. A system according to claim 1 for two waves, comprising four antennas arranged on the corners of a square having a side length $a$, each of these antennas being connected to a frequency-selective means comprising an amplifier, and further comprising a computing device in which the four voltages are analyzed in accordance with the equations:

$$\frac{V_1 e^{-jau_1} - V_2}{V_3 e^{-jau_1} - V_4} e^{-jav_2} = 1$$

$$\frac{V_1 e^{-jav_1} - V_2}{V_2 e^{-jav_1} - V_4} e^{-jau_2} = 1$$

by eliminating the factors A in such a manner that, after solving of the above-mentioned equations, voltages proportional to $au_1$, $av_2$, $au_2$ and $av_2$ are available for indication.

3. A system according to claim 1, wherein the computing means comprises an analog computer.

4. A system according to claim 1, wherein the computing means comprises a digital apparatus.

5. A system according to claim 1, wherein cathode ray tube means are provided for receiving and presenting the sine and cosine components.

6. A space-direction coupler for separating the individual waves of an interference field, said coupler comprising a system according to claim 1.

References Cited in the file of this patent

UNITED STATES PATENTS 2,437,695    Jansky _____ Mar. 16, 1948

UNITED STATES PATENT OFFICE
CERTIFICATE OF CORRECTION

Patent No. 3,056,959                      October 2, 1962

Karl Baur

It is hereby certified that error appears in the above numbered patent requiring correction and that the said Letters Patent should read as corrected below.

In the grant, line 1, in the drawings, Sheets 1 and 2, line 1, and in the lower right-hand corner thereof, and in heading to the printed specification, line 3, name of inventor, for "Karl Baür", each occurrence, read
-- Karl Baur --.

Signed and sealed this 12th day of February 1963.

SEAL)
Attest:

ERNEST W. SWIDER
Attesting Officer

DAVID L. LADD
Commissioner of Patents